United States Patent [19]

Aveneau et al.

[11] Patent Number: 4,669,080
[45] Date of Patent: May 26, 1987

[54] SYNCHRONIZING CIRCUIT IN A PLESIOCHRONOUS DIGITAL SIGNAL MULTIPLEXER

[76] Inventors: André A. Aveneau; Jean-Louis V. Guichard, both of 41, rue Cantagrel, 75631 Paris Cedex 13, France

[21] Appl. No.: 729,427

[22] Filed: May 1, 1985

[30] Foreign Application Priority Data

May 11, 1984 [FR] France ............................. 84 07369

[51] Int. Cl.[4] .............................................. H04J 3/06
[52] U.S. Cl. .................................... 370/101; 370/102; 375/112
[58] Field of Search ....................... 370/100, 101, 102; 375/112, 118

[56] References Cited

U.S. PATENT DOCUMENTS

| | | | |
|---|---|---|---|
| 3,830,981 | 8/1974 | Gruber et al. ....................... | 370/102 |
| 3,916,084 | 10/1975 | Toole ................................. | 375/118 |
| 3,919,647 | 11/1975 | Haass ................................ | 375/118 |
| 4,002,844 | 1/1977 | Doussoux . | |
| 4,063,040 | 12/1977 | Fontanes et al. ................... | 370/102 |
| 4,076,964 | 2/1978 | Henrion et al. ..................... | 370/102 |
| 4,408,333 | 10/1983 | Fujii .................................... | 375/118 |

OTHER PUBLICATIONS

A. Aveneau et al, "Possibilities Given by the Use of Large Scale Integrated Ckts. in the 2048-8448 kbit/s Multiplexer-Demultiplexer", IEEE, Mar. 1976, pp. A2.1-A2.4.

Primary Examiner—Douglas W. Olms
Assistant Examiner—Wellington Chin
Attorney, Agent, or Firm—Laubscher & Laubscher

[57] ABSTRACT

The invention relates to a synchronizing circuit for synchronizing one of N digital plesiochronous signals with a local clock signal with a view to transcoding and justifying the plesiochronous signal in a multiplexer. More particularly, the invention is directed to the regeneration of a timing signal relative to the plesiochronous signal by use of logic circuits permitting integration. A timing signal generating device comprises a first logic circuit for periodically deleting a pulse in the local clock signal in terms of a phase-shift between the regenerated timing signal and the clock signal to produce an intermediate clock signal having a periodically deleted pulse comparatively with the local clock signal, and a second logic circuit for dividing the intermediate clock signal in frequency by 2N to produce the regenerated timing signal.

5 Claims, 2 Drawing Figures

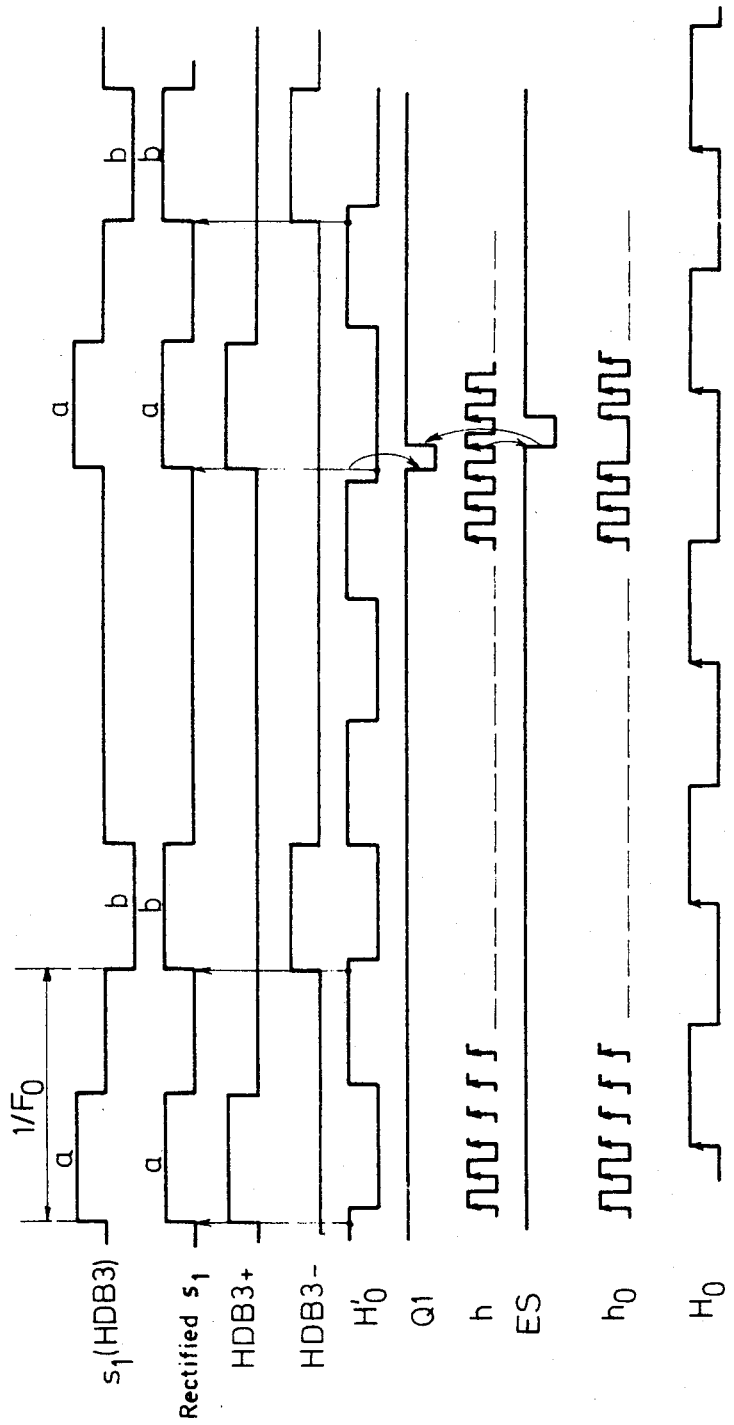

SYNCHRONIZING CIRCUIT IN A PLESIOCHRONOUS DIGITAL SIGNAL MULTIPLEXER

BACKGROUND OF THE INVENTION

1. Field of the Invention

The present invention relates to synchronization of plesiochronous digital signals received in bipolar code in a digital multiplexer working on the basis of positive justification. More particularly, the invention deals with a circuit for synchronizing one of the plesiochronous signals with a local clock signal for the purpose of transcoding and justifying the plesiochronous signal.

2. Description of the Prior Art

To be more precise, this invention concerns generation of a timing signal in input means included in such a synchronizing circuit. The input means is sometimes called a "junction", as taught in the article by Andre AVENEAU and Xavier BARBIER, IEEE INTERNATIONAL ZURICH SEMINAR ON DIGITAL COMMUNICATIONS, Zürich, 9th-11th March 1976, pages A2.1 to A2.4, New-York, and arranged before justifying, or stuffing, and storing means in a time-division multiplexer, as disclosed in U.S. Pat. No. 4,002,844.

To recover a timing signal corresponding to the bit rate of a plesiochronous signal, the input means in known synchronizing circuits comprises analog components such as filters that are poorly suited to integration.

OBJECT OF THE INVENTION

With this state of the art in mind, it is a main object of this invention to provide a plesiochronous signal synchronizing circuit in which timing signal recovery is achieved by means of logic circuits permitting integration in a logic microstructure circuit.

SUMMARY OF THE INVENTION

Accordingly, the synchronizing circuit of this invention is included in a multiplexer N plesiochronous digital signals having a nominal timing frequency susbtantially less than a predetermined timing frequency h/(2N) into a resultant signal having a timing frequency h/2.

The synchronizing circuit comprises an oscillator supplying a local clock signal, means receiving the local clock signal and one of the plesiochronous signals coded in a bipolar code for regenerating a timing signal peculiar to the plesiochronous signal and having significant times synchronous with significant times of the local clock signal, and transcoding, justifying and storing means receiving the plesiochronous signal and the regenerated timing signal for raising the nominal timing frequency of the received plesiochronous signal to the predetermined timing frequency to synchronize the plesiochronous signal by justification into a justified signal.

The timing signal regenerating means comprises logic means for periodically deleting a pulse in the local clock signal in terms of a phase shift between the regenerated timing signal and the local clock signal to produce an intermediate clock signal having a periodically deleted pulse comparatively with the local clock signal, and logic means for dividing the intermediate clock signal in frequency by 2N to derive the regenerated timing signal.

BRIEF DESCRIPTION OF THE DRAWING

Other features and advantages of the invention will be apparent from the following more particular description of preferred embodiments of the invention as illustrated in the corresponding accompanying drawings in which:

FIG. 2 shows the waveforms of signals derived in the synchronizing circuit to recover a timing signal in relation to a received plesiochronous signal.

DESCRIPTION OF THE PREFERRED EMBODIMENTS

Figure 1:
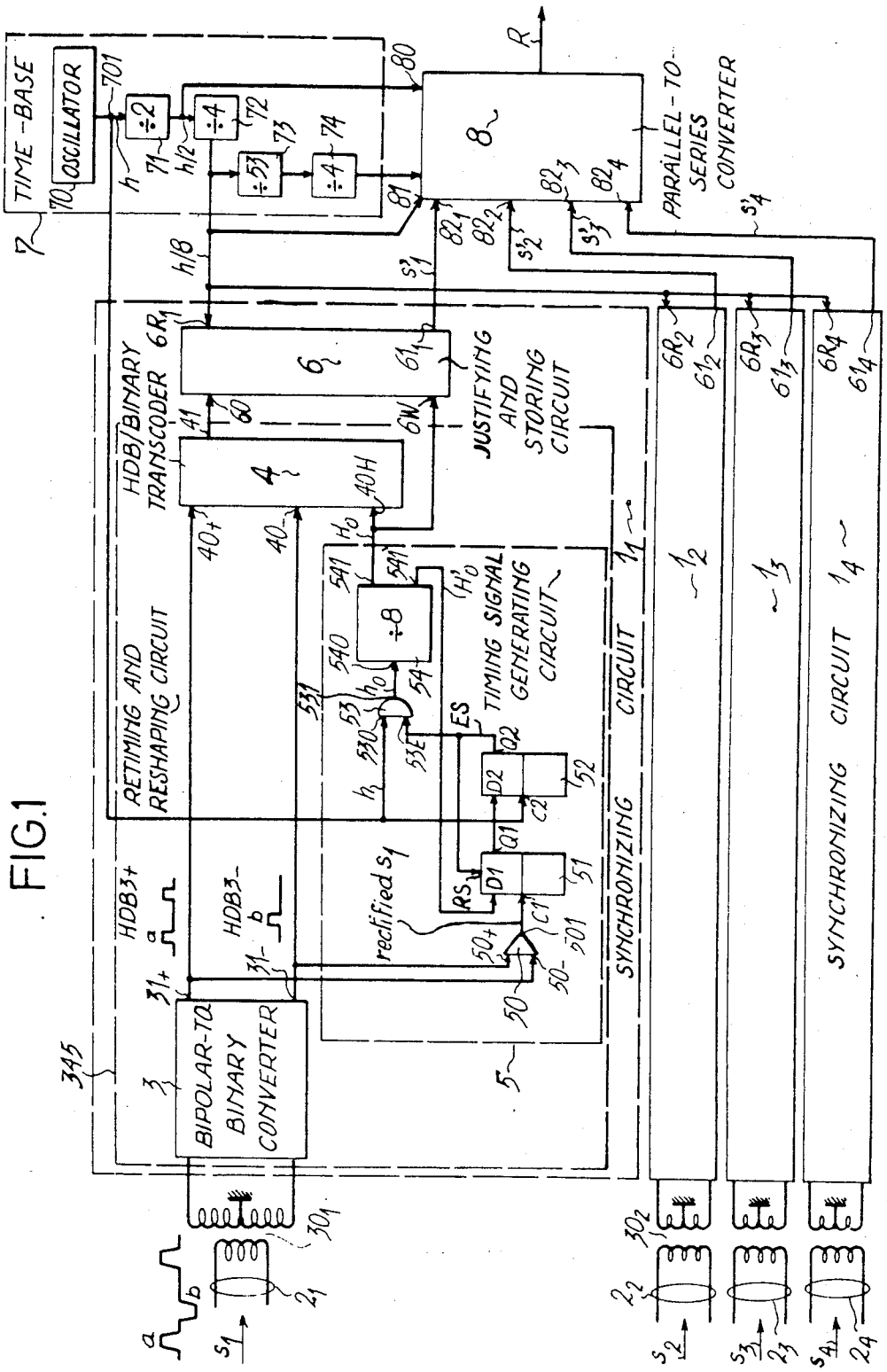
FIG. 1 is a block diagram of a multiplexer multiplexing N=4 plesiochronous digital signals, one of the synchronizing circuits in the multiplexer being shown in detail.

In a preferred embodiment, reference is made to time-division multiplexing N=4 plesiochronous digital component signals $s_1$ to $s_4$ having a low nominal bit rate equal to $d_0=2048$ kbit/s into a resultant digital signal R having a high nominal bit rate equal to $D_0=8448$ kbit/s. By definition, the component signals have real rates varying above and below the low nominal rate $d_0$ within predetermined limits because of independance in respective clocks by means of which the component signals are derived. Before going through multiplexing, the component signals $s_1$ to $s_4$ are converted into component signals referred to as justified to stuffed signals $s'_1$ to $s'_4$ having a common rate $d'_0=D_0/N=2112$ kbit/s in respective synchronizing circuits. The rate $d'_0$ is substantially higher than the data rate $d_0$ and is given by the relationship:

$$d'_0 = (1+\epsilon)d_0$$

where $\epsilon$ denotes a number less than one and is chosen such that the rate $d'_0$ is always greater than all the real rates of the component signals $s_1$ to $s_4$. A difference between the rate $d'_0$ and the real rates of the component signals is filled up by filling bits called justification or stuffing bits in keeping with a known positive-justification multiplexing method. In practice, the difference in rates motiving synchronization of the component signals $s_1$ to $s_4$ results in the systematic insertion of justification or stuffing indication bits as well as in a frame alignment word and where applicable, service bits having predetermined respective locations in a frame of the resultant signal R. For a component signal, a justification indication bit is intended for indicating whether a justification bit filling a predetermined location in the frame is transmitted or replaced by an informative bit, with a view to a subsequent demultiplexing operation on the resultant signal.

Depicted in detail in FIG. 1 is a synchronizing circuit $1_1$ in relation to one of the component signals $s_1$ to $s_4$, e.g. the signal $s_1$. Other synchronizing circuits $1_2$ to $1_4$ related to the signals $s_2$ to $s_4$ are identical to circuit $1_1$.

The digital component signal $s_1$ is transmitted in a high density bipolar code HDBn in a balanced transmission line $2_1$. It is recalled that a digital signal coded in an HDBn code is a bipolar signal in which a binary zero is coded as a "0", and a binary one is coded alternately as a positive polarity mark a or a negative polarity mark b, as shown in a first line in FIG. 2. n denotes a predetermined integer indicating the maximum number of successive zeros that the bipolar signal can carry. In a sequence of (n+1) successive zeros in the initial binary signal, the last bit is replaced in a known fashion by a bipolarity violation mark. Referring to FIG. 1, the component signal $s_1$ is transmitted in HDB3 code from line $2_1$ to a bipolar-to-binary converter 3 through an input transformer $30_1$. Two outputs $31_+$ and $31_-$ of the converter 3 respectively feed two binary signals $HDB3_+$ and $HDB3_-$ to two inputs $40_+$ and $40_-$ of a transcoder 4 and to two inputs $50_+$ and $50_-$ of an OR gate 50 included in a timing signal regenerating circuit 5. The signals $HDB3_+$ and $HDB3_-$ are shown in the third and fourth lines in FIG. 2. The signal $HDB3_+$ and comprises state "1" bits that correspond to the positive marks a in the coded signal $s_1$, and state "0" bits that correspond to both the negative marks b and zeros in the coded signal $s_1$. The signal $HDB3_-$ comprises "1" bits that correspond to the negative marks b in the coded signal $s_1$, and "0" bits that correspond to both the positive marks a and zeros in the coded signal $s_1$.

Converter 3, transcoder 4 and circuit 5 constitute together a retiming and reshaping circuit 345, sometimes called as a junction, that delivers the received signal $s_1$ in the shape of a reshaped binary signal, and a timing signal derived from the received signal.

An output 41 from the transcoder 4 transmits the reshaped signal in binary code with a mean timing frequency $f_0 = 2048$ kHz to an input 60 on a justifying and storing circuit 6. A timing signal $H_0$ regenerated by circuit 5 and peculiar to the component signal $s_1$ controls the operations of transcoding the signals $HDB3_+$ and $HDB3_-$ into the binary signal in the transcoder 4 and writing the binary signal in a buffer store included in circuit 6.

As will be seen hereinafter, timing signal $H_0$ is synchronized with a clock signal produced locally by an oscillator 70 and having a frequency h equal to twice the timing frequency $h/2 = 8448$ kHz of the resultant signal R, i.e. $h = 16\ 896$ kHz. Oscillator 70 is included in a time-base 7 in the multiplexer which derives all the clock signals required for raising the rate from $d_0$ to $d'_0$ and for multiplexing justified or stuffed signals $s'_1$ to $s'_4$. Time-base 7 comprises in particular a divide-by-2 frequency divider 71 and a divide-by-4 frequency divider 72 connected in series to an output 701 of the oscillator 70. The first frequency divider 71 delivers a clock signal at the frequency $h/2 = 8448$ kHz to a clock input 80 common to shift-register stages included in a conventional parallel-to-series converter 8. The second frequency divider 72 delivers a clock signal $h/8$ with a frequency of 2112 kHz to reading clock inputs $6R_1$ to $6R_4$ relative to buffer stores included respectively in the justifying and storing circuits in synchronizing circuits $1_1$ to $1_4$. The clock signal $h/8$ is further fed to a clock input 81 of AND gates included in converter 8 and having outputs respectively connected to inputs of shift-register stages. Other inputs $82_1$ to $82_4$ of the aforesaid AND gates respectively receive the justified binary signals $s'_1$ to $s'_4$ transmitted respectively by outputs $61_1$ to $61_4$ from the buffer stores in the synchronizing circuits $1_1$ to $1_4$.

Justifying and storing circuit 6 comprises in a known manner, the buffer store, justification requesting means, read means for controlling justifications, and a phase comparator. Circuit 6 is intended for raising the initial bit rate $d_0$ to the rate $d'_0$ by systematically inserting justification indication bits and, if required, justification bits in the reshaped binary signal at output 41 from transcoder 4. The bits in the reshaped signal are written in the buffer store in circuit 6 under the control of the signal $H_0$ fed to a writing clock input 6W of circuit 6. The bits in the justified signal $s'_1$ are read under the control of the signal $h/8$ applied to input $6R_1$.

The parallel-to-series converter 8 multiplexes bit-by-bit the $N = 4$ justified component signals $s'_1$ to $s'_4$ into the resultant signal R and, at a frame frequency, inserts a frame alignment word and service bits typically consisting of 12 bits. As an example, a frame comprises 848 bits and a frequency FT equal to 9.95 kHz obtained from a divide-by-53 frequency divider 73 and a divide-by-4 frequency divider 74 both connected in series with divider 72 in the time-base.

The timing signal regenerating circuit 5 includes, in addition to OR gate 50, two D type flip-flops 51 and 52, two-input AND gate 53 and a divide-by-8 frequency divider 54 such as a modulo-8 counter. A clock input C1 of flip-flop 51 and a clock input C2 of flip-flow 52 are connected to an output 501 of OR gate 50 and to output 701 of oscillator 70 respectively. Input D1 of flip-flop 51 and input D2 of flip-flop 52 are connected to an output 541' of frequency divider 54 and to output Q1 of flip-flop 51 respectively. Output Q2 of the second flip-flop 52 is connected to a preset input RS of the first flip-flop 51 and to an input 53E on gate 53. AND gate 53 carries another input 530 connected to oscillator output 701, and an output 531 connected to an input 540 of frequency divider 54. An output 541 of frequency divider 54 transmits regenerated timing signal $H_0$ to a clock input 40H of transcoder 4 and to the writing clock input 6W of circuit 6.

As shown in a last line in FIG. 2, timing signal $H_0$ presents a series of pulses with a frequency $f_0 = 2048$ kHz and carries a mean frequency equal to the real bit rate of the component signal $s_1$. Since the component signals $s_1$ to $s_4$ are by definition plesiochronous, the respective regenerated timing signals, such as the timing signal $H_0$ for the signal $s_1$, have different mean frequencies. The timing signal $H_0$ is also periodically synchronous with the local clock signal h and offers rise fronts determining significant times that each lie between rise and fall fronts of a same pulse in a rectified HDB3 bipolar signal produced by the output 501 from the gate 50, as shown in a second line in FIG. 2. The signal $H_0$ is obtained by frequency dividing by $2N = 8$ of an intermediate clock signal $h_0$ delivered from output 531 of two-input AND gate 53, as shown in a penultimate line in FIG. 2. By comparison with the clock signal h derived by the local oscillator 70 and shown in a seventh line in FIG. 2, the signal $h_0$ consists of pulses synchronous with those of the signal h and, periodically, a deleted pulse representing an eighth of a phase shift between the writing signal $H_0$ and the reading signal $h/8$. Pulse deletion therefore takes place at an erase frequency of $2112/(8(2112-2048))$ kHz, and is achieved in the AND gate 53 by means of an erasing signal ES delivered from output Q2 of flip-flop 52, as shown in the eighth line in FIG. 2.

The erasing signal ES is derived by phase comparison in the first flip-flop 51 between the rectified signal $s_1$ and a timing signal $H'_0$ transmitted by output 541' of frequency divider 54. As indicated in the fifth line in FIG. 2, the signal $H'_0$ has a phase shift of $\pi/2$ compared to the signal $H_0$ and carries rise fronts substantially out of phase with rise fronts of the rectified signal $s_1$. A phase comparing signal shown in a sixth line in FIG. 2 is provided by output Q1 from flip-flop 51 such that just one pulse in the signal h is periodically erased. The erasing signal ES also serves in resetting the flip-flop 51 so that the phase comparing signal at output Q1 from flip-flop 51 be to "1". Via the AND gate 53 and the frequency divider 54, erasing signal SE slaves the signal H′$_0$ such that the fall fronts of the signal H′$_0$ are substantially in phase with the rise fronts of the rectified signal s$_1$, to within one period of the local clock signal h.

It is to be noticed that the synchronizing circuit embodying the invention involves a clock signal h with a frequency equal to twice the clock frequency h/2 of the signal R resulting from multiplexing. This makes it possible after dividing the signal h by two frequency-wise in the divider 71 to calibrate the bits in the resultant signal R correctly.

Furthermore, the low ratio equal to 2N=8 between the frequency of the local clock signal h and the frequency of the regenerated timing signal H$_0$ has no adverse effect on how the multiplexer works. Indeed, the binary signal leaving the transcoder 4 and reshaped in terms of the signal H$_0$ is processed in the circuit 6 which reads the binary signal under the control of the clock signal h/8 obtained directly from the local clock signal h. The phase comparator in circuit 6 absorbs any phase fluctuation in the reshaped binary signal. As a result, the highest clock frequency used in the synchronizing circuit does not exceed a frequency that is twice the timing frequency of the resultant signal R and is strictly necessary for HDB3 coding on the resultant signal R for subsequent transmission. On a more general footing, the locak clock signal frequency can be equal to Kh where K is an integer greater than or equal to unity; in this instance, the frequency divider 71 accomplishes a frequency division by 2K, and the frequency divider 54 accomplishes a frequency division by 2NK.

What we claim is:

1. A synchronizing circuit in a multiplexer multiplexing N plesiochronous digital signals having a nominal timing frequency substantially less than a predetermined timing frequency h/(2N) into a resultant signal having a timing frequency h/2, said synchronizing circuit comprising an oscillator supplying a local clock signal, means receiving said local clock signal and on of said plesiochronous signals coded in a bipolar code for regenerating a timing signal peculiar to said plesiochronous signal and having significant times synchronous with significant times of said local clock signal, said regenerated timed signal having a mean timing frequency equal to said nominal timing frequency, transcoding means receiving said plesiochronous signal and said regenerated timing signal for transcoding said plesiochronous signal into a reshaped binary signal timed by said regenerated timing signal, and storing and justifying means receiving said reshaped binary signal, said regenerated timing signal and said predetermined timing frequency for storing said reshaped binary signal under the control of said regenerated timing signal into a stored signal and for justifying said stored signal as a function of phase difference between said regenerated timing signal and said predetermined timing frequency into a justified signal timed at said predetermined timing frequency, and said timing signal regenerating means comprising logic means for periodically deleting a pulse in said local clock signal in terms of a phase-shift between said regenerated timing signal and said local clock signal to produce an intermediate clock signal having a periodically deleted pulse comparatively with said local clock signal, and logic frequency dividing means for dividing said intermediate clock signal in frequency by 2N to derive said regenerated timing signal.

2. The synchronizing circuit claimed in claim 1 wherein said frequency dividing means also supplies a second timing signal having a phase shift of $\pi/2$ with respect to said regenerated timing signal, and wherein said deleting means comprises means for rectifying said plesiochronous signal in said bipolar code into a rectified signal, a first flip-flop having an input receiving said second timing signal and a clock input receiving said rectified signal, a second flip-flop having an input connected to an output of said first flip-flop, a clock input receiving said local clock signal and an output connected to a preset input on said first flip-flop, and a two-input AND gate having an input receiving said local clock signal, another input connected to said output of said second flip-flop and an output feeding said intermediate clock signal to an input of said frequency dividing means.

3. The synchronizing circuit claimed in claim 1 wherein said local clock signal supplied by said oscillator has a frequency equal to Kh, where K is an integer greater than or equal to unity, and wherein said frequency dividing means have a dividing coefficient of 2NK.

4. A synchronizing circuit as claimed in claim 3 comprising a first divide-by-2 frequency divider connected to said oscillator, and other frequency dividers connected to said first divider for deriving clock signals intended for controlling justification and multiplexing operations on said plesiochronous signal.

5. The synchronizing circuit claimed in claim 1 wherein said bipolar code is an HDBn high density bipolar code.

* * * * *